G. LISPENARD.
COTTON HARVESTER.
APPLICATION FILED SEPT. 11, 1906.

975,775.

Patented Nov. 15, 1910.
7 SHEETS—SHEET 2.

Witnesses
C. W. Benjamin
Chas. G. Hensley

Inventor
George Lispenard.
By his Attorney
Joseph L. Levy

G. LISPENARD.
COTTON HARVESTER.
APPLICATION FILED SEPT. 11, 1906.
975,775.
Patented Nov. 15, 1910.
7 SHEETS—SHEET 3.
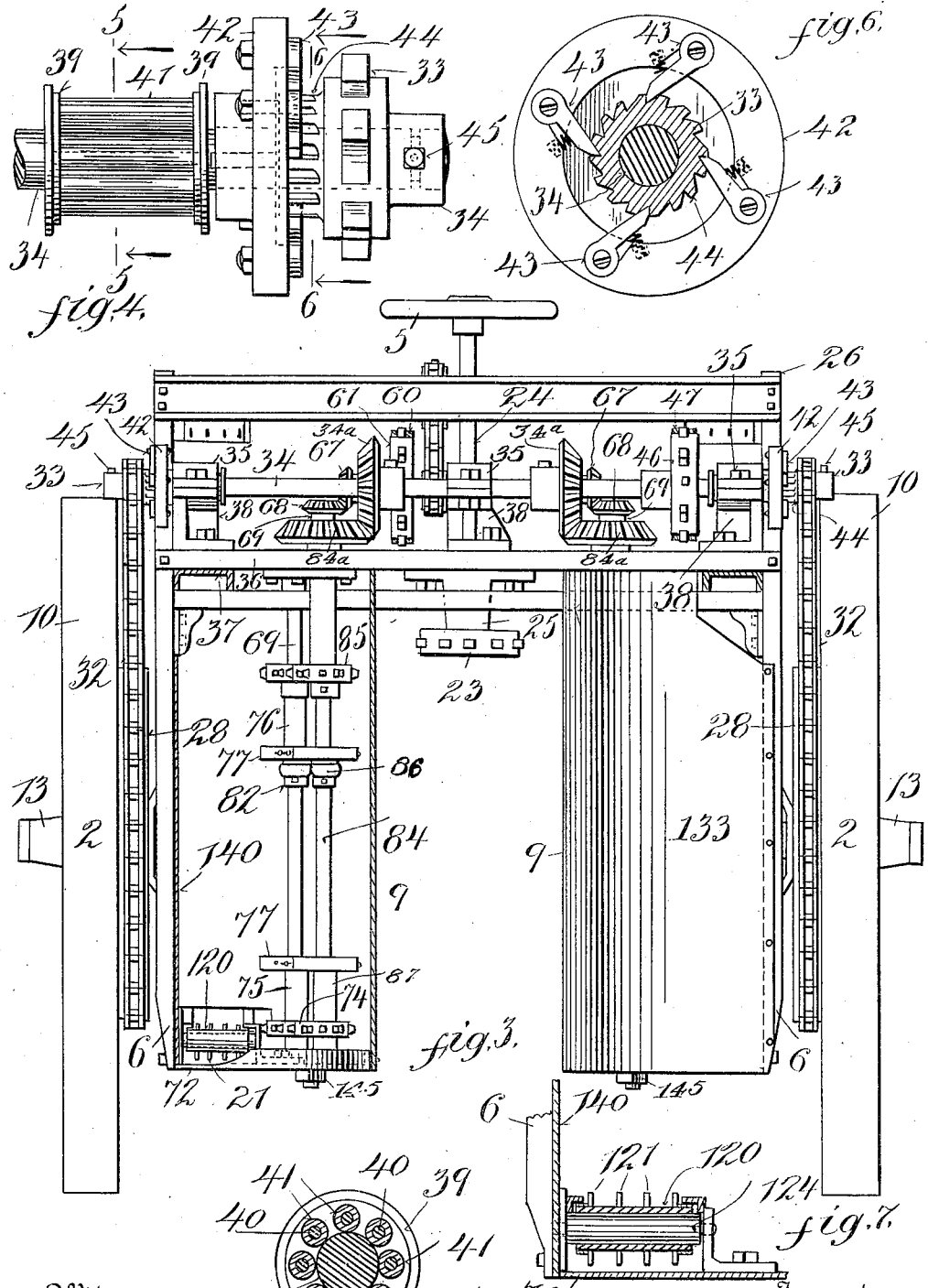

G. LISPENARD.
COTTON HARVESTER.
APPLICATION FILED SEPT. 11, 1906.
975,775.
Patented Nov. 15, 1910.
7 SHEETS—SHEET 4.
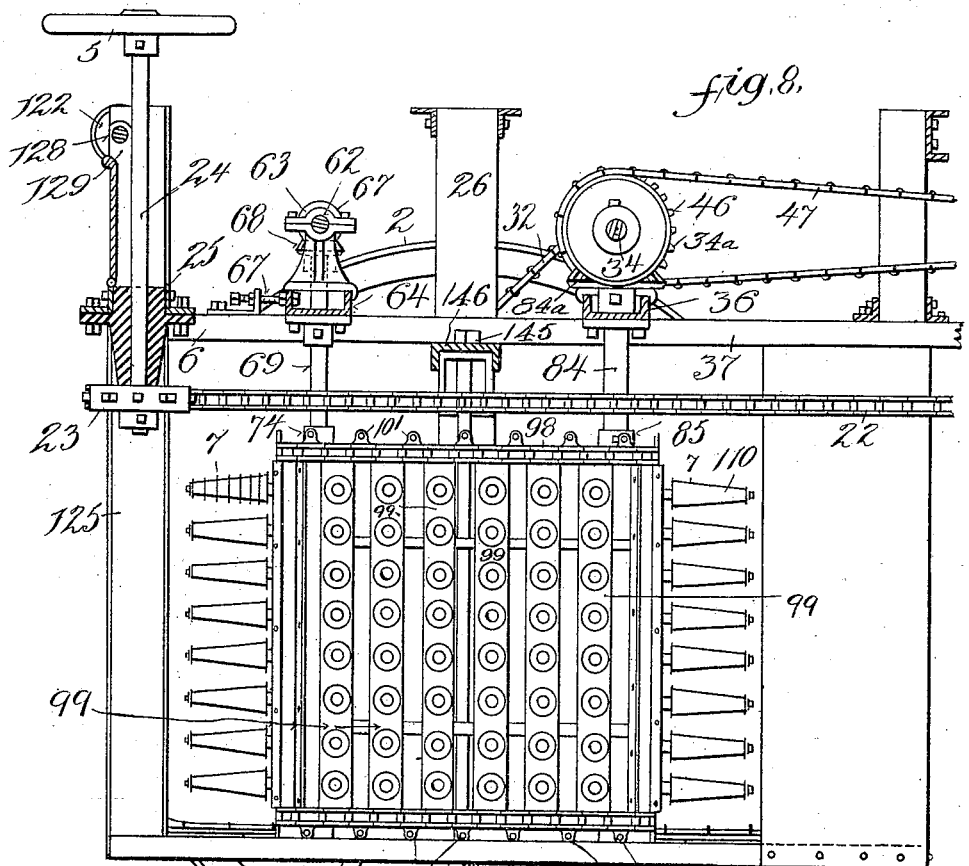
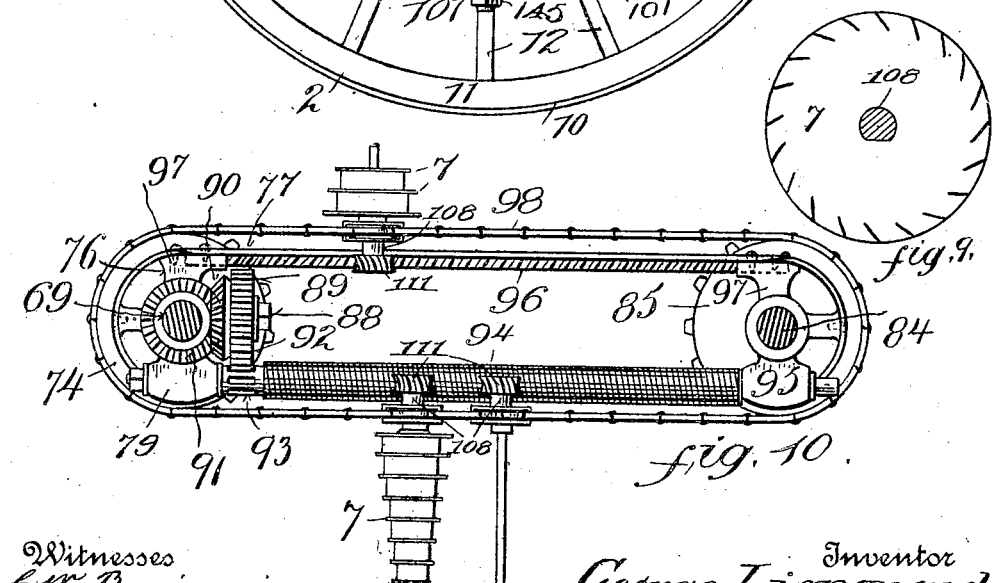

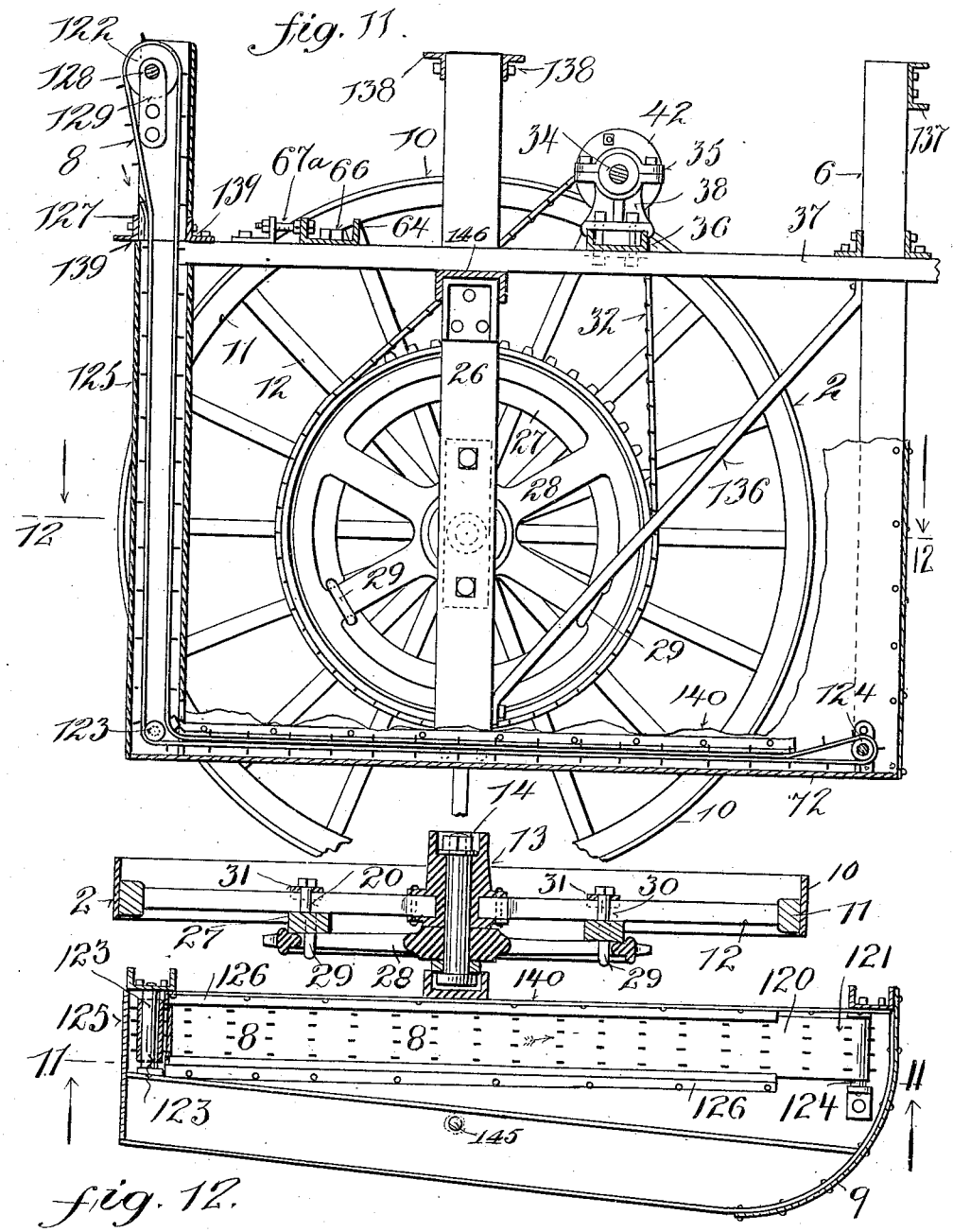

G. LISPENARD.
COTTON HARVESTER.
APPLICATION FILED SEPT. 11, 1906.
975,775.
Patented Nov. 15, 1910.
7 SHEETS—SHEET 6.
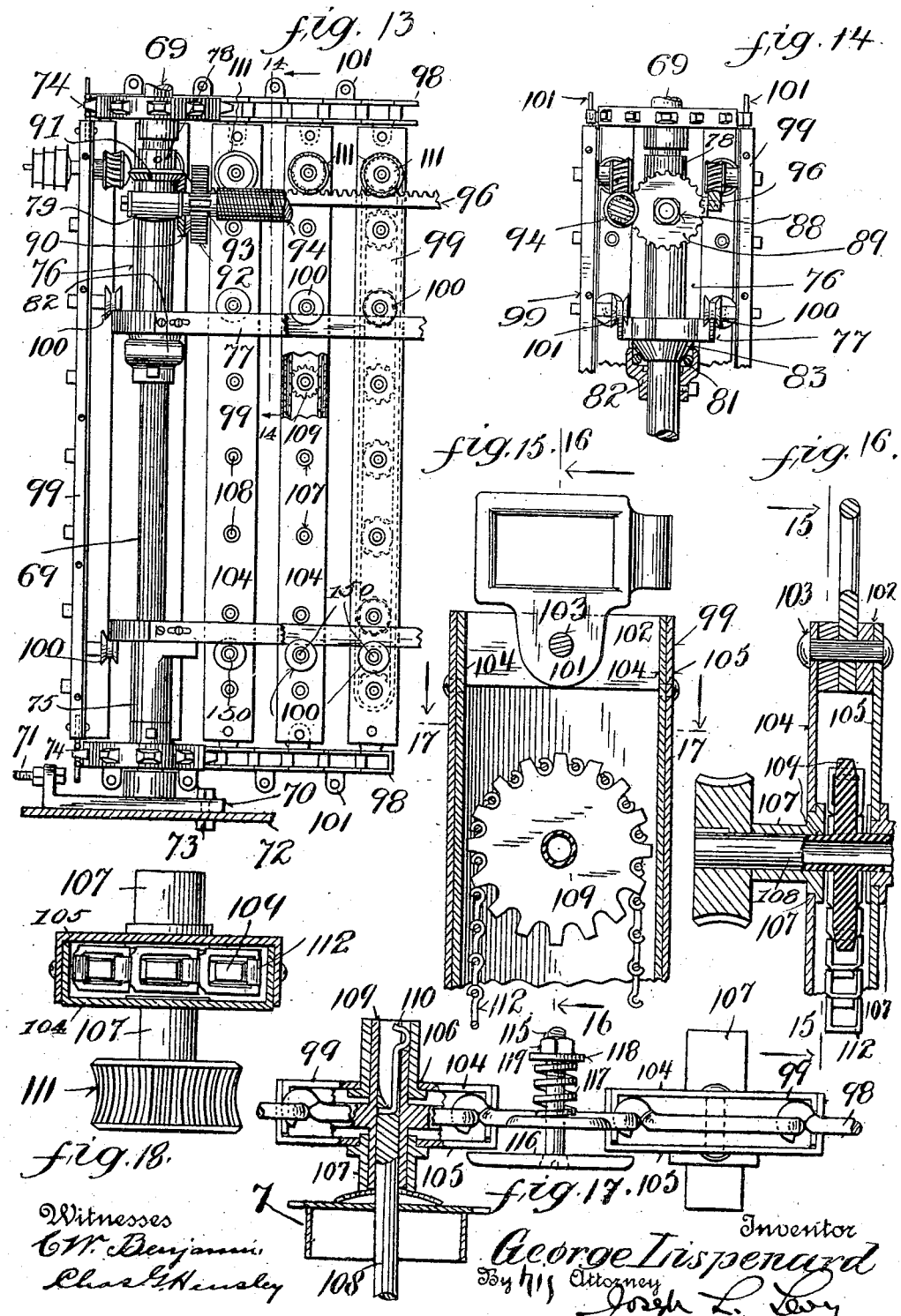

G. LISPENARD.
COTTON HARVESTER.
APPLICATION FILED SEPT. 11, 1906.

975,775.

Patented Nov. 15, 1910.
7 SHEETS—SHEET 7.

Witnesses
W. May. Durall
A.W. Neale, Jr.

Inventor
George Lispenard,
by
Joseph L. Levy
Attorney

UNITED STATES PATENT OFFICE.

GEORGE LISPENARD, OF NEW YORK, N. Y., ASSIGNOR TO SOLOMON K. LICHTENSTEIN, TRUSTEE, OF NEW YORK, N. Y.

COTTON-HARVESTER.

975,775.  Specification of Letters Patent.  Patented Nov. 15, 1910.

Application filed September 11, 1906. Serial No. 334,092.

*To all whom it may concern:*

Be it known that I, GEORGE LISPENARD, a citizen of the United States, and a resident of the city of New York, borough of Brooklyn, county of Kings, and State of New York, have invented a new and useful Improvement in Cotton-Harvesters, of which the following is a specification.

The object of my invention is to provide a machine of this class which will gather into bags the ripe cotton out of the bolls without injury to the plants, and to do this with economy and despatch.

More particularly, the object of my invention is to improve machines of the class shown in my Patent 783792, granted Feb. 28th, 1905.

Figure 1:
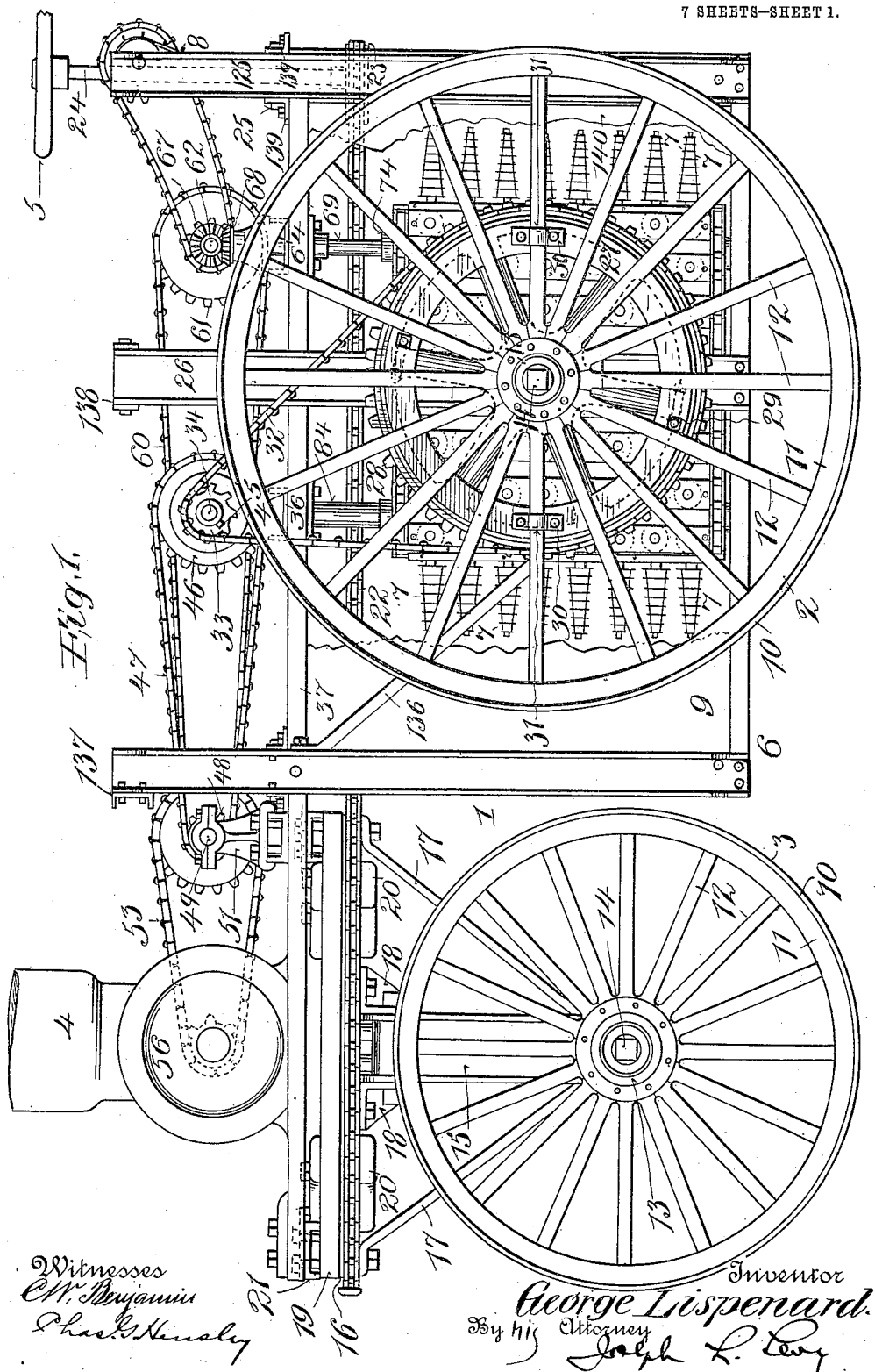
Figure 2:
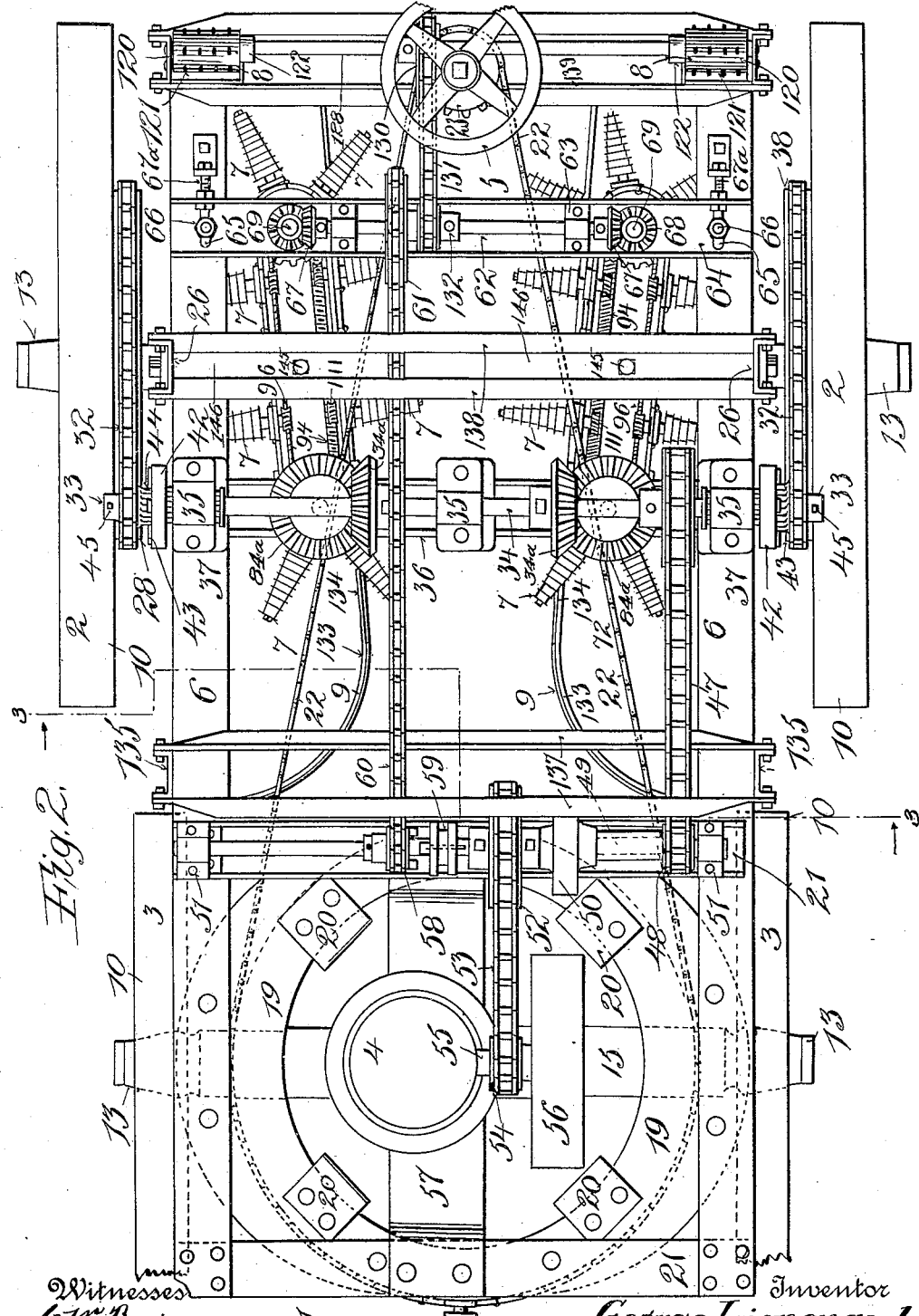
Figure 19:
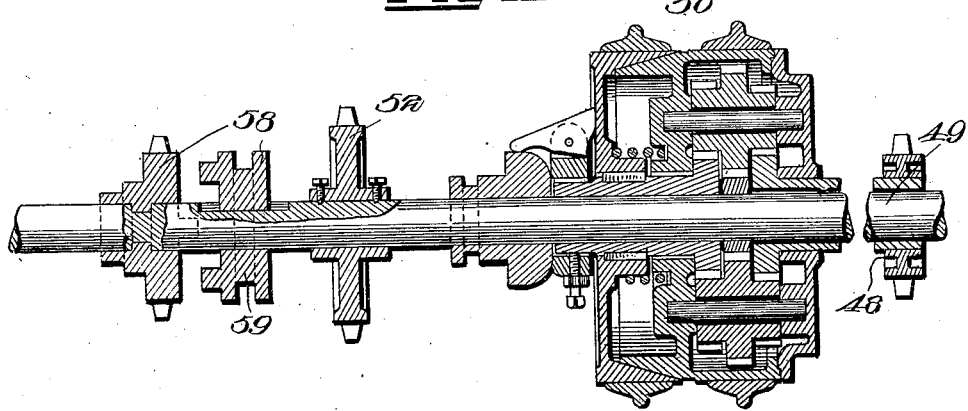
Figure 20:
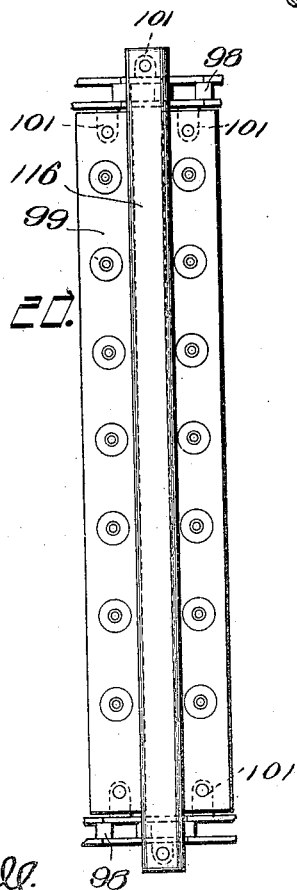

For a more particular description of my invention reference is to be had to the accompanying drawings forming a part hereof, in which:

Figure 1 is a side elevation of one embodiment of my invention. Fig. 2 is a plan view of the same. Fig. 3 is a sectional view looking toward the rear. Fig. 4 is a detailed view of a portion of a shaft and bearing, and Figs. 5 and 6 are sectional views taken on the lines 5—5 and 6—6 of Fig. 4, looking in the direction of the arrows. Fig. 7 is a detail of a portion of the conveying mechanism. Fig. 8 is a sectional view showing a portion of the picking mechanism. Fig. 9 shows a portion of the pickers or disks. Fig. 10 is a sectional plan view of the pickers and their operative mechanism. Fig. 11 is a sectional view taken on the line 11—11 of Fig. 12, looking in the direction of the arrows. Fig. 12 is a sectional view taken on the line 12—12 of Fig. 11, looking in the direction of the arrows. Fig. 13 is an elevation showing a portion of the picking mechanism. Fig. 14 is a sectional view of a portion of the same. Fig. 15 is a sectional view taken on the line 15—15 of Fig. 16, looking in the direction of the arrows. Figs. 16 and 17 are sectional views taken on the lines 16—16 and 17—17 of Fig 15, looking in the direction of the arrows. Fig. 18 is a top plan view of the gearing for driving the picker spindles. Fig. 19 is a cross section showing the differential gear mechanism and related parts. Fig. 20 is a front view showing two of the picker housings and the overlapping plate therefor, with the sprocket chain connections.

Throughout the various views of drawings, similar reference characters designate similar parts.

The harvester 1 is provided with rear wheels 2, front wheels 3, an engine 4, a steering wheel 5, a frame 6, pickers 7, conveyers 8, guides 9, and such other intermediate mechanism as may be necessary to render these parts operative. The wheels 2 and 3 are of the usual form of wagon wheels with wide tires 10, fellies 11, spokes 12, and hubs 13, except that the rear wheels 2 do not have the fellies in the centers of the tires but near the inner edges so as not to interfere with the driving chain as will appear below. The hubs 13 are on stud axles because the machine is adapted to straddle a row of plants and therefore must have no parts which would unnecessarily interfere with them. In the case of the front wheels 3, the studs 14 are fixed in a yoke 15 which is fixed to a fifth wheel 16 braced by suitable irons 17 and 18. The slide 19 against which the fifth wheel 16 slides, is provided with suitable guides 20 and is fixed to the crossings 21 and the sills 37 of the frame 6. These guides 20 perform the functions of the ordinary king bolt, but leave the central space free for the engine 4. A sprocket chain 22 is suitably secured to the fifth wheel 16 and runs to a small sprocket wheel 23 on the shaft 24 of the steering wheel 5, so that by turning the wheel 5 in either direction, a corresponding turn is made by the front wheels 3, and the machine may be steered thereby. The shaft 24 is journaled in a bearing 25 fixed to the frame 6.

The axles 14 of the rear wheels are mounted, as shown in Figs. 11 and 12, in uprights 26 which form parts of the frame 6. The precise manner in which this is done is not material, provided these axles 14 are securely held. To the spoke 12 of each of these wheels is secured an annulus 27 on which is placed a large sprocket wheel 28, the parts being held together by suitable U bolts 29, which unite the sprocket 28 and the annulus 27 and another set of bolts 30 and plates 31 which fix the annulus to the spokes 12. Sprocket chains 32 run from the sprocket wheels 28 to smaller sprocket wheels 33 loosely mounted on a shaft 34 which is journaled in roller bearings 35 on the crossing 36, which extends transversely of the machine and frame 6, and rests on the longitudinal sills 37 of this frame. The bearings 35 have suitable pedestals 38 in which are loosely mounted collars 39 united by pins 40, a sin the ordinary lantern gear, and on these pins 40 are mounted the hollow cylinders 41 which turn freely thereon. These parts together form the roller bearing 35 which greatly reduce friction, as is usual in such structures. The shaft 34 has fixed thereto a disk 42 by pin and slot connection, and on this disk are a number of spring pressed pawls 43 which engage teeth 44 on the small sprocket 33 and at one side of the teeth whic hengaeg the chain 32. This sprocket 33 is held in position by means of a screw or bolt 45, the end of which rests in an annular groove, not shown, on the shaft 34. This loose mounting of the sprockets 33 permits either of them to revolve at a higher velocity than the shaft 34, so that when one of the driving wheels 2 revolves faster than the other, as when going around a curve, no damage results to the machine. The teeth of the sprocket 33 which engage the chain 32 are made to drive in one direction, as this permits a smaller sprocket to be used and works with less friction. As the machine is never run backward more than a few feet at a time, and this at infrequent intervals, these sprockets answer all purposes. However, the usual sprockets may be substituted, if desired. The shaft 34 is driven by a sprocket 46, fixed thereto, which engages a chain 47 driven by a sprocket 48 on a sleeve on the main shaft 49, and which revolves as required by a differential mechanism 50. The differential mechanism 50 is shown in section in Fig. 19. This is a well known transmission gear permitting two speeds forward and one reverse. The shaft 49 is journaled in bearings 51 and always runs in the same direction and at an approximately constant speed. It is driven by a sprocket 52 fixed thereto with a chain 53, which engages another sprocket 54 on the shaft 55 of the engine 4. A fly wheel 56 keeps the speed nearly constant. Any suitable form of engine may be employed, but I prefer a gas engine of the ordinary type because of its compactness and convenience. This engine 4 rests on any suitable support or spring 57 secured to the crossings 21.

On the main shaft of the machine is mounted a loose sprocket 58 which may be fixed to the shaft by the usual clutch 59, in the customary manner, or may be so released. The levers for operating this clutch 59 and the gears 50 are omitted for convenience. It is sufficient to say that they are long enough to enable them to be operated by the person who steers at the wheel 5. His seat is in the rear of the machine, and is omitted as it forms no part of my invention. A chain 60 is driven from the loose sprocket 58 which runs another sprocket 61 on a shaft 62 journaled in suitable bearings 63, mounted on an adjustable bar 64. This bar 64 is slotted at 65, and bolts 66 pass through to secure it to the bar 37 of the frame, and this bar 64 may be given its precise adjustment by the screws 67ª.

The shaft 62 has a bevel gear 67 mounted at each end which meshes with a corresponding gear 68 on a vertical shaft 69. Through this shaft the pickers are rotated. The lower end of the shaft rests in a bearing 70, which may be shifted by a screw adjustment 71 until in perfect alinement. The bearing 70 rests on a platform 72 secured to the frame 6. A bolt 73 passing through the platform and a suitable slot in the bearing secures this bearing 70 in place. At the top and bottom of this shaft 69 are loosely mounted sprocket wheels 74, and between these are supports 75 and 76 for tracks 77. Extending from the upper support 76 is a sleeve 78, which has a horizontal bearing 79 on its inner side, and a connection 97 for a rack bar on its outer. This support 76 is preferably mounted with a ball bearing, the balls 81 being carried by a cup 82 fixed to the shaft. The cone 83 is fixed to the lower end of the sleeve 78. The platform 72 is supported by bolts 145 hung from a crossing 146 of the frame 6.

Parallel with each of the shafts 69 are shafts 84, which carry sprockets 85, identical with the sprockets 74 and in alinement therewith, and also supports 86 and 87 for the tracks 77, which are also identical with those above described. The bearings of these shafts 84 are the ordinary ones and need no description. Bevel gears 84ª are fixed to the upper ends of these shafts and mesh with similar gears 34ª fixed on the shaft 34. These bevel gears drive the chains and housings for the pickers, as will appear below. The shafts 84 are a little nearer the longitudinal axis of the machine than the shafts 69, for a reason that will appear below. The sleeve 78 also carries stud 88 on which is mounted a double gear 89, one part of this double gear is beveled at 90 to mesh with a similar gear 91 fixed to the shaft 69, and the other is an ordinary spur gear 92, which meshes with teeth 93 in the threaded spindle 94, which is journaled at one end in the bearing 79, and at the other end in a similar bearing 95 supported on the spindle 84. These bearings are kept in alinement by the spindle 94, and also by a rack bar 96, which runs parallel therewith and is fixed to projections 97 on the sleeves 76 and 87.

The sprocket wheels 74 and 85 carry chains 98 which are united by vertically disposed housings 99, which carry the rotating pickers 7. These housings 99 each carry a number of spindles, say eight, which row of spindles extends from the top to the bottom of the cotton bearing part of a cotton plant. They are kept in position by wheels 100 which run above the upper track 77, and below the lower track 77, as shown in Fig. 13. The wheels 100 are carried by any suitable supports, 150, or run loosely on spindles 108. As each housing with its spindles and rotating mechanism is identical with every other, a description of one will answer for all.

Alternate links of the chains 98 have perforated projecting lugs 101, which extend into corresponding openings in the end plates 102 of the housings 99, and are there secured by rivets 103. For convenience all links of these chains are formed with these perforated lugs 101, which makes these links interchangeable. There is an additional reason for this which will appear below. Each housing has four of its six faces formed by two troughs 104 and 105, which have overlapping edges which fit tight and have registering perforations 106 for the spindle bearings 107 in which the spindles 108 are journaled for the pickers 7. Each of the spindles 108 is provided with a sprocket wheel 109 with long sleeves, which extend into the bearings 107. The spindle 108 and sprocket 109 are fixed together by a suitable spring catch 110, which extends into corresponding slots in them. This prevents any relative movement of these parts. The spindles 108 of the top row are extended to receive a worm gear 111, which is cut to mesh either with the spindle 94, or with the rack bar 96 with its diagonally disposed teeth. In each housing 99 a sprocket chain 112 runs over all the sprockets 109 and causes them to have the same angular velocity as each is identical with the other. The pickers 7 need no further description as they are identical in form with those shown and described in my above mentioned patent, and perform the same functions. Nor are the cleaning brushes shown or described, for the same reason.

As the delicate mechanism of my improved harvester must be kept as free as possible of dirt and lint and foreign matter, I prefer to utilize the otherwise useless lugs 101 which extend away from the housings 99 and between the same by a screw 115 through each, and mounting at one end of this screw an overlapping plate 116 extending from top to bottom of these housings 99, and placing a spring 117, washer 118 and nut 119 at the other end of screw 115, so that the plates 116 are spring pressed against the housings 99. Only the upper mounting is shown in detail in Fig. 17, because the lower is identical therewith.

As the machine advances, the housings 99 are moved from front to rear at exactly the same velocity the machine moves forward, the gears being designed for this purpose. The pickers 7 are rotated by the screw, or worm 94 and revolve rapidly near the plants. When they pass the curves at each end they have no rotative movement. When they are inoperative during their movement forward, they are rotated backward by the rack 96, and the brushes not shown then remove the cotton which falls upon the conveyer 8, and is carried off as described below. The spindles 84 are rotated as by the gears 84$^a$ and 34$^a$ and drive the picking mechanism. Each conveyer 8 is preferably an endless belt 120 armed with the usual spikes 121 at regular intervals, which belt runs over driving roller 122, and idle rollers 123 and 124 suitably mounted on the platform 72 in the direction indicated by the arrows in Fig. 12. The cotton falls on the belt 120 where it is horizontal and is moved with it over the roller 124, then over the floor 72 to the vertical wall 125, which prevents any separation of the conveyer and cotton, thence over the upper edge 127 of the wall 125, and then the cotton falls into the bag, not shown, at the rear of the machine. Suitable guides 126 run horizontally and over the belt 120 until it turns to the vertical. The rollers 122 are at or near each end of the shaft 128 and fixed thereto. This shaft 128 is rotated in bearings 129 by a sprocket wheel 130 driven by a chain 131 from a small sprocket wheel 132 on the shaft 62. This causes the conveyers 8 to move in unison with the pickers. The exterior of each conveyer chamber is also protected by a plate 140.

The guides 9 are curved plates 133 and angles 134, preferably of metal, which are fixed to the frame 6 below the sills 37 and to the forward upright 135, and thence they are carried inwardly and rearwardly. At or about the point of nearest approach the plates 133 terminate so as not to inerfere with the pickers 7 and the angles 134 continuing to the rear of the machine diverging from each other and carrying the floors 72. These guides 9 are so shaped as to first cause the parts of each plant to be drawn somewhat together, but not enough to injure the plant, and then when the plates 133 are passed, to fly out into the pickers 7, which are near the plant throughout its productive zone. These pickers will engage any lint that they may touch and pull it from the bolls, but will not otherwise disturb the plant. The pickers are sufficiently numerous to engage any lint protruding from a boll, but not close enough to engage or interfere with the main stem of the plant.

The frame 6 includes the crossings and braces and sills and the other parts above mentioned, and any others which may be desirable or necessary to render the structure sufficiently rigid, such as the diagonal ones 136 near the rear wheels 2 and the crossings 137, 138 and 139.

In view of the foregoing, a general description of the operation of my machine will be readily understood. While the harvester is in use, the engine 4 operates at a constant speed, and drives the main shaft 49 at a proportional speed. When the shaft 49 is rotated, the sprocket chain 47 is driven and this drives the sprocket wheel 46, shaft 34, sprocket 23, chains 32 and wheels 2 thus propelling the machine, usually at a rate of about five or six miles an hour, more or less as may be desired. Bevel gears 34$^a$ on the shaft 34 drive similar gears 84$^a$ on the vertical shafts 84 which through the sprocket wheels 85 and clains 98, drive the wheels 74 but not the shafts 69 so that the pickers 7 and their housings 99 are carried from front to rear when near the center of the machine and from rear to front when at the sides. The mechanism is so proportioned that the pickers 7 are moved to the rear as fast as the machine moves forward so that, they have no forward movement when operating on a plant. The rotation of these pickers about their axes is nearly independent of this front and rear movement just above described because it is derived directly from the sprocket wheel 58 which is driven by the shaft 49 through the shiftable clutch 59. The sprocket wheel 58 driven through the clutch 59, drives a chain 60, wheel 61, shaft 62, bevel gears 67, gears 68, and shafts 69. The shafts 69 drive the bevel gears 89 on studs 88, and through them the screw shaft or worm shaft 94 which rotates the worm gears 111 on spindles 108 which are also driven and form part of the pickers 7. As the shafts 69 are more widely separated than the shafts 84, the pickers 7 separate along the direction of their axes during the forward movement of the machine and so for a short interval remain near each plant and each part of each plant. As the machine progresses, the guides 9 draw the leaves and branches together and when clear of them, the plant reacts and its leaves, pods and branches are all thrown into the reach of the pickers 7. These pickers 7 will collect nothing but ripe cotton, either from the bolls or pods or from a picker below so that while gathering the cotton, its movement is upwardly both away from the plant and ground and dirt. Unripe cotton is not gathered, nor are the plants injured or bruised.

When free of the worm 94, the gears 111 are rotated in the opposite direction by the rack 96 and then the cotton which has accumulated on the upper spindles descends to the lowest and falls off them with little or no aid from brushes, on to the conveyer 8 and is then accumulated in bags, not shown. If the ripe cotton is thicker in one place than another, the advance of the machine may be correspondingly checked without checking the harvesting capacity of the pickers 7 because they rotate at nearly the same velocity regardless of the progress of the machine.

When the machine is being moved without harvesting, as along a highway, the clutch 59 enables the spindle rotating mechanism to become inoperative in so far as the drive of the shaft 69 is concerned. The gears 34$^a$ or 84$^a$ might be mounted so as not to rotate when not in use for harvesting, if such is desired. The machine may be steered as above described, and controlled in the same way.

All delicate mechanism in the machine which might be injured by moisture, or dirt, or lint, is carefully protected in tight cases, so that the mechanism will operate at all times without undue wear or trouble of any kind.

As other embodiments of my invention may be made which employ its essential characteristics, I do not regard it as limited thereto, it is broad enough to cover all structures that come within the scope of the annexed claims.

What I claim is:

1. In a machine of the class described, the combination of a plurality of pickers and means for supporting and operating the same so that said pickers may be positively given both a rotary and a rectilinear movement longitudinally of and relative to the machine, or only a rotary movement.

2. In a machine of the class described, a plurality of pickers mounted in parallel rows, means for causing said pickers in each row to rotate in unison, an extended shaft in one of said pickers, a worm gear on said shaft, a worm meshing with said gear, means for supporting said worm perpendicular to said row of pickers, and means for rotating said worm.

3. In a machine of the class described, a plurality of pickers mounted in parallel vertical rows, a housing for each row of pickers, spindles mounted in said housings and supporting said pickers, one spindle for each picker, means for causing said spindles to rotate in unison independently of the movement of said housings, means for supporting said housings, and means for moving said housings.

4. In a machine of the class described, a plurality of pickers and means for supporting the same, means independent of the movement of the machine for giving said pickers a rotating movement, and means for giving said pickers a movement from front to rear of the machine when said pickers are in their operative position.

5. In a machine of the class described, a plurality of pickers mounted in parallel vertical rows and means for supporting the same, means for causing each row of pickers to move from front to rear of the machine while said pickers are in their operative position at the same velocity at which the machine moves forward, and means for rotating said pickers independently of the movement of the machine.

6. In a machine of the class described, a plurality of pickers mounted in parallel rows in two sets, one set on each side of the longitudinal axis of the machine, means for moving each set of pickers rearwardly of the machine while in their operative position, and also divergently, and moving said pickers at substantially the same speed rearwardly that the machine moves in a forward direction, and means for rotating said pickers independently of the movement of the machine.

7. In a machine of the class described, a plurality of pickers and means for supporting the same, means for moving said pickers rearwardly of the machine and away from its longitudinal axis at the same velocity at which the machine moves forward, and means for rotating said pickers independently of the movement of the machine.

8. In a machine of the class described, a plurality of pickers mounted in parallel vertical rows, a housing in which each of said pickers is mounted, mechanism incased in each housing for causing all pickers mounted in that housing to rotate in unison, and means for driving said mechanism independently of the movement of the machine.

9. In a machine of the class described, a plurality of wheels for supporting said machine and an engine mounted in said machine, and means for causing said engine to move the machine, a plurality of cotton pickers and means for supporting the same in said machine, means for moving said pickers rearwardly at the same speed at which the machine advances and simultaneously with said advance, and means for causing said engine to rotate said pickers independently of the movement of the machine.

10. In a machine of the class described, a pair of parallel shafts, supports mounted on said shafts, said supports being connected on one side by a rack bar, and on the other by a screw, means for rotating said screw, cotton pickers, and means for causing said screw to rotate said pickers in one direction at a time, and said rack to rotate said pickers in the opposite direction at another time.

11. In a machine of the class described, a pair of parallel and vertically disposed shafts, a sprocket wheel on each end of each shaft, parallel sprocket chains uniting said wheels, supports carried by said shafts a screw on one side and a rack on the other side, uniting said supports, means for rotating said screw, housings uniting the chains, gears carried by said housings and adapted to engage either said rack or said screw and pickers mounted in said housings and driven by said gears.

12. In a cotton harvester or similar device, a vertically disposed shaft, a support loosely mounted on said shaft, a rack fixed to one side of said support, a screw journaled in the support, a stud on said support, a pinion fixed to said screw, a gear on said stud driving said pinion, a bevel gear driving said gear, and a second bevel gear fixed to said shaft and adapted to mesh with and drive the other bevel gear, means for supporting the other ends of said rack and screw and cotton harvesting means driven by said screw.

13. In a cotton harvester or similar device, a pair of parallel vertically disposed shafts, supports on said shafts, tracks connecting said supports, a pair of sprockets on each of said shafts, parallel chains connecting said sprockets, parallel housings connecting said chains, and wheels on said housings above and below said tracks whereby said housings are prevented from lateral movement.

14. In a machine of the class described, the combination of a pair of parallel shafts, a pair of sprocket wheels located on each of said shafts, parallel sprocket chains passing over said parallel wheels, respectively, said sprocket chains being provided with projecting lugs on the links thereof, housings carrying picker spindles connecting the links of said sprocket chains and secured to said lugs, and guard plates overlapping adjacent housings and connected to some of said lugs.

15. In a machine of the class described, a pair of parallel shafts, sprocket wheels on said shafts, a pair of parallel chains uniting said sprocket wheels, each of the links of said chains being provided with laterally projecting lugs, housings uniting some of said lugs, and plates uniting some of said lugs and overlapping adjacent housings.

16. In a machine of the class described, a pair of parallel shafts, sprocket wheels on said shafts, a pair of parallel chains uniting said sprocket wheels, each of the links of said chains being provided with laterally projecting lugs, housings uniting some of said lugs, plates uniting some of said lugs, and spring controlled bolts for holding said plates in position so that they will overlap adjacent housings.

17. In a machine of the class described, the combination of supporting chains, the links of said chains being provided with perforated lugs, a housing comprising two open ended troughs, one nesting within the other, and plates located in the open ends of said troughs, and means for securing said troughs, end plates, and lugs together.

18. In a machine of the class described, the combination of supporting sprocket chains, the links whereof are provided with perforated lugs, a housing comprising two open-ended troughs, one nesting within the other, end plates within the ends of said troughs, said troughs being provided with openings in alinement with each other, bearings in said openings, and means for securing said troughs, end plates and lugs together.

19. In a machine of the class described, the combination of supporting sprocket chains, the links of which are provided with perforated lugs, a housing comprising two open-ended troughs, one nesting within the other, end plates, said troughs being provided with openings in alinement with each other, bearings in said openings, picker spindles mounted in said bearings, and means for securing said troughs, end plates and lugs together.

20. In a machine of the class described, a pair of parallel chains, lugs extending from said chains, housings fixed to said lugs, registered openings for bearings in said housings and plates uniting some of said lugs and overlapping said housings.

21. In a machine of the class described, a pair of parallel chains, lugs extending upwardly and downwardly from said chains, housings fixed to the lugs between said chains, registered openings for bearings in said housings, and plates secured to the other lugs extending from said chains and covering the space between said housings.

22. In a cotton harvester or similar device, an engine, a main shaft, and means connecting said engine and main shaft whereby the former drives the latter, a differential speed mechanism on said shaft and means on said shaft for driving two wheels of said harvester, and means for connecting up said differential speed mechanism with said engine, so that the machine may be driven at a desired speed, pickers, and means for moving them in their operative position, and then rearwardly at the same speed at which the machine advances, a sprocket on said main shaft, a secondary shaft parallel with said main shaft, a sprocket on the same, and a chain connecting said second sprocket with the corresponding sprocket on the main shaft, and means connected with said secondary shaft for rotating the pickers.

23. In a machine of the class described, the combination of cotton picking mechanism, two driving wheels, two steering wheels, a frame supported by said wheels, three parallel shafts, mounted in the same plane, on said frame and running transversely of the machine, the first shaft being the main shaft, means for driving said main shaft, connections whereby the movement of said main shaft drives each of the other two shafts, means for causing one of said shafts to operate the driving wheels, means for causing the other shaft to operate the cotton picking mechanism, and clutches and a differential gear mounted on said main shaft, whereby the cotton picking mechanism may be operated independently of the driving wheels, when desired.

24. In a machine of the class described, a frame comprising longitudinal sills united by transversely disposed parallel crossings, vertically disposed irons united at their upper ends by crossings, guides secured to some of said vertically disposed irons, said guides being so shaped and arranged as to first converge rearwardly near their forward ends, and then diverge throughout the greater portion of their length, a flooring supported by said guides and frame, parallel shafts above said flooring, cotton picking mechanism supported by said shafts, and means for causing said mechanism to come into its operative position from the rear of the converging portion of the guides and to operate while over the diverging portion of said guides.

25. In a machine of the class described, a frame comprising longitudinal sills united by transversely disposed parallel crossings, vertically disposed irons united at their upper ends by crossings, guides secured to some of said vertically disposed irons, said guides being so shaped and arranged as to first converge rearwardly near their forward ends, and then diverge throughout the greater portion of their length, a flooring supported by said guides and frame, a conveyer running over said flooring and adapted to catch the cotton which falls thereon and convey it to the top and rear of the machine, and means for supporting and operating said conveyer.

26. In a machine of the class described, a frame comprising longitudinal sills united by transversely disposed parallel crossings, vertically disposed irons united at their upper ends by crossings, guides secured to some of said vertically disposed irons, said guides being so shaped and arranged as to first converge rearwardly near their forward ends, and then diverge throughout the greater portion of their length, a flooring supported by said guide and frame, a conveyer running over said flooring and adapted to catch the cotton which falls thereon and convey it to the top and rear of the machine, means for supporting and operating said conveyer, and harvester means carried above said conveyer and adapted to place the cotton thereon.

27. In a machine of the class described, the combination of parallel sprocket chains, vertically located housings connected to said sprocket chains, bearings in alinement with each other, mounted in said housings, a spindle carrying a picker, mounted in each pair of bearings, a sprocket wheel mounted on each of said spindles, a spring catch removably connecting each of said spindles to its corresponding sprocket wheel, and a sprocket chain passing over all of the sprocket wheels in the vertical housings.

28. In a machine of the class described, the combination of a pair of horizontal sprocket chains, vertical housings secured to said sprocket chains, each of said housings being provided with a series of pairs of bearings in alinement with each other, a spindle mounted in each pair of bearings, a sprocket wheel secured to each of said spindles, a sprocket chain connecting all of said sprocket wheels together, the uppermost spindle of the series of spindles mounted in the housing being extended and provided with a worm wheel, and means engaging with said worm wheel to operate said spindles.

Signed this 10th day of September, 1906.

GEORGE LISPENARD.

Witnesses:
    GUSTAVE I. ARONOW,
    B. V. MOHAN.